Figure 1:
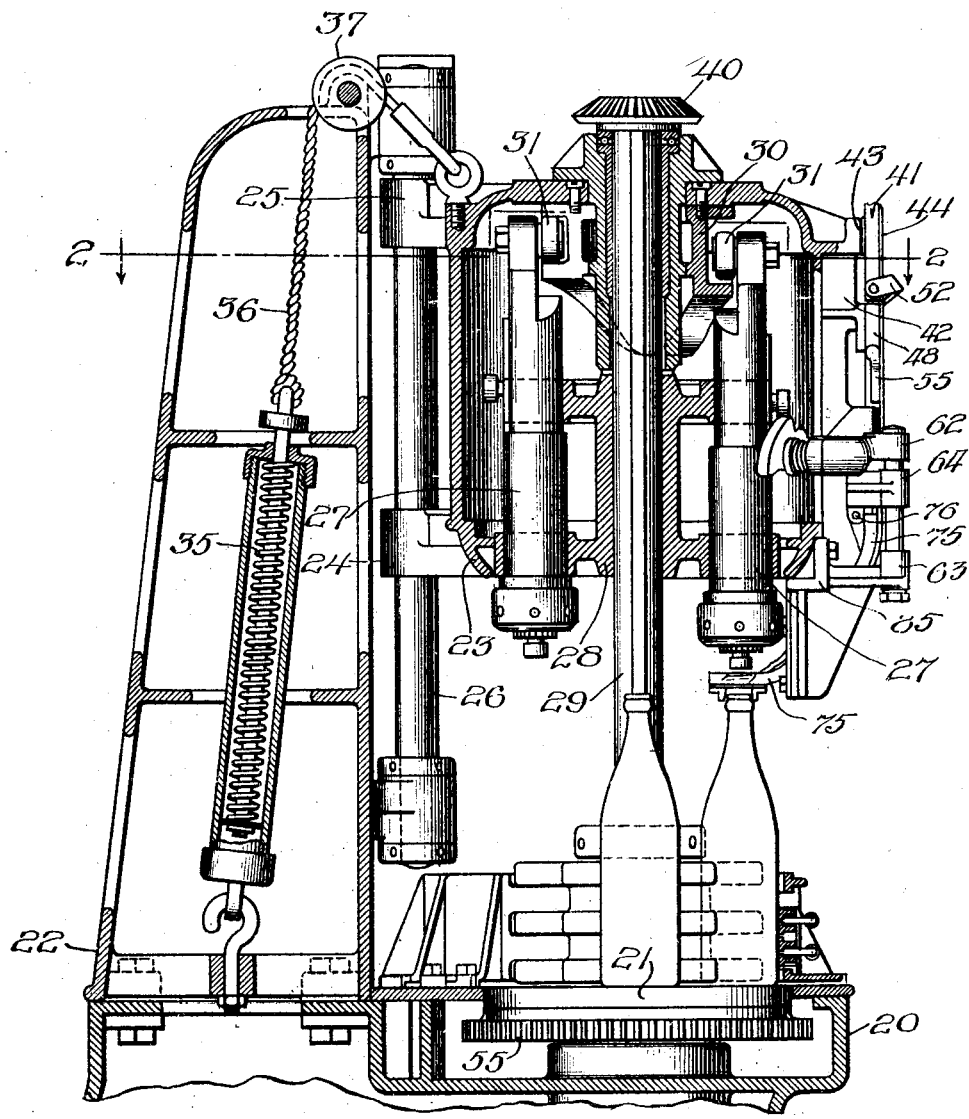

Oct. 9, 1928.  
V. J. MOHLER  
1,687,303  
BOTTLE CROWNING MACHINE  
Filed Feb. 15, 1924  
10 Sheets-Sheet 2

Inventor  
Valentine J. Mohler  
by Rector Hibben Davis & Macauley  
his Attorneys

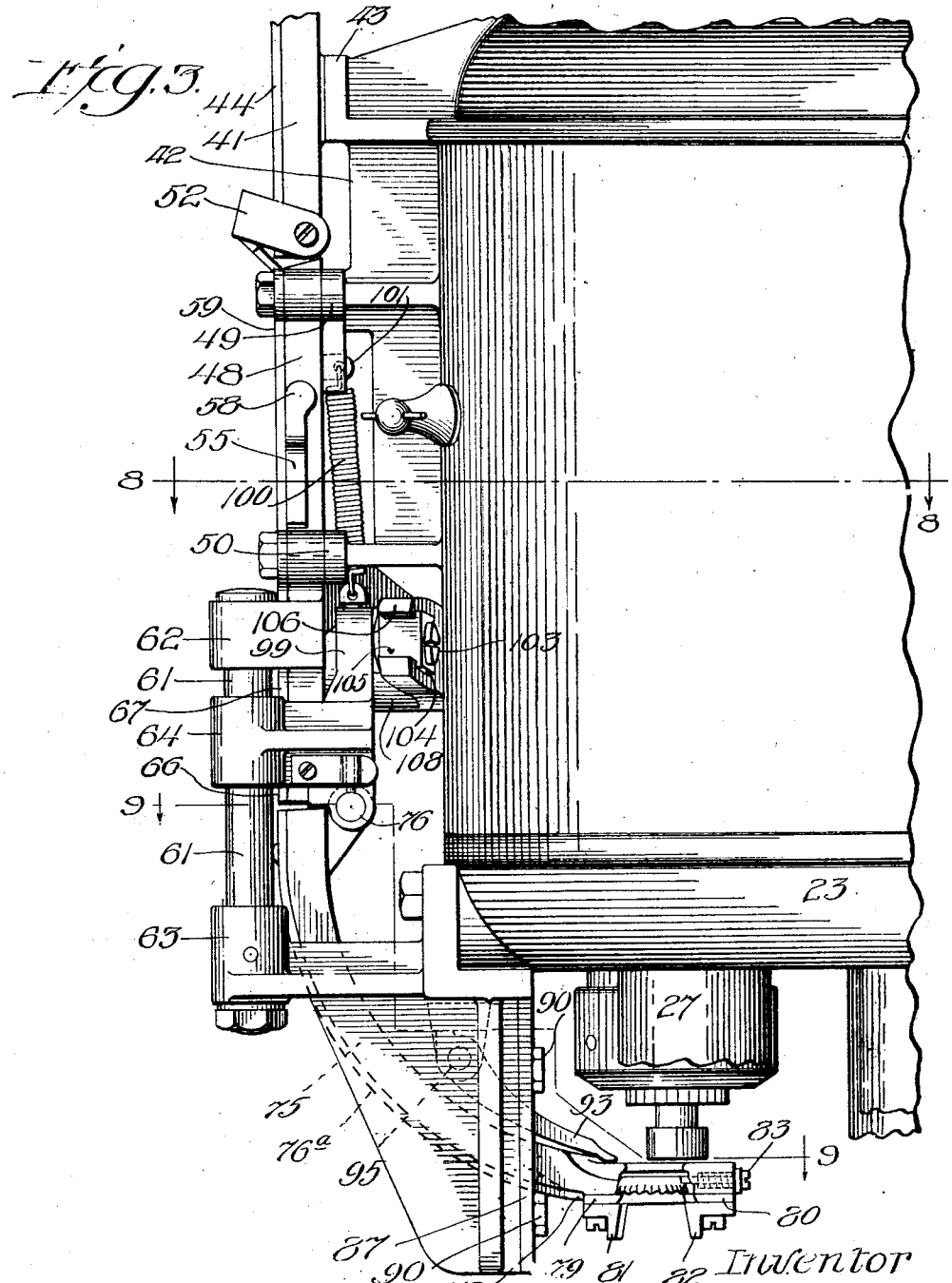

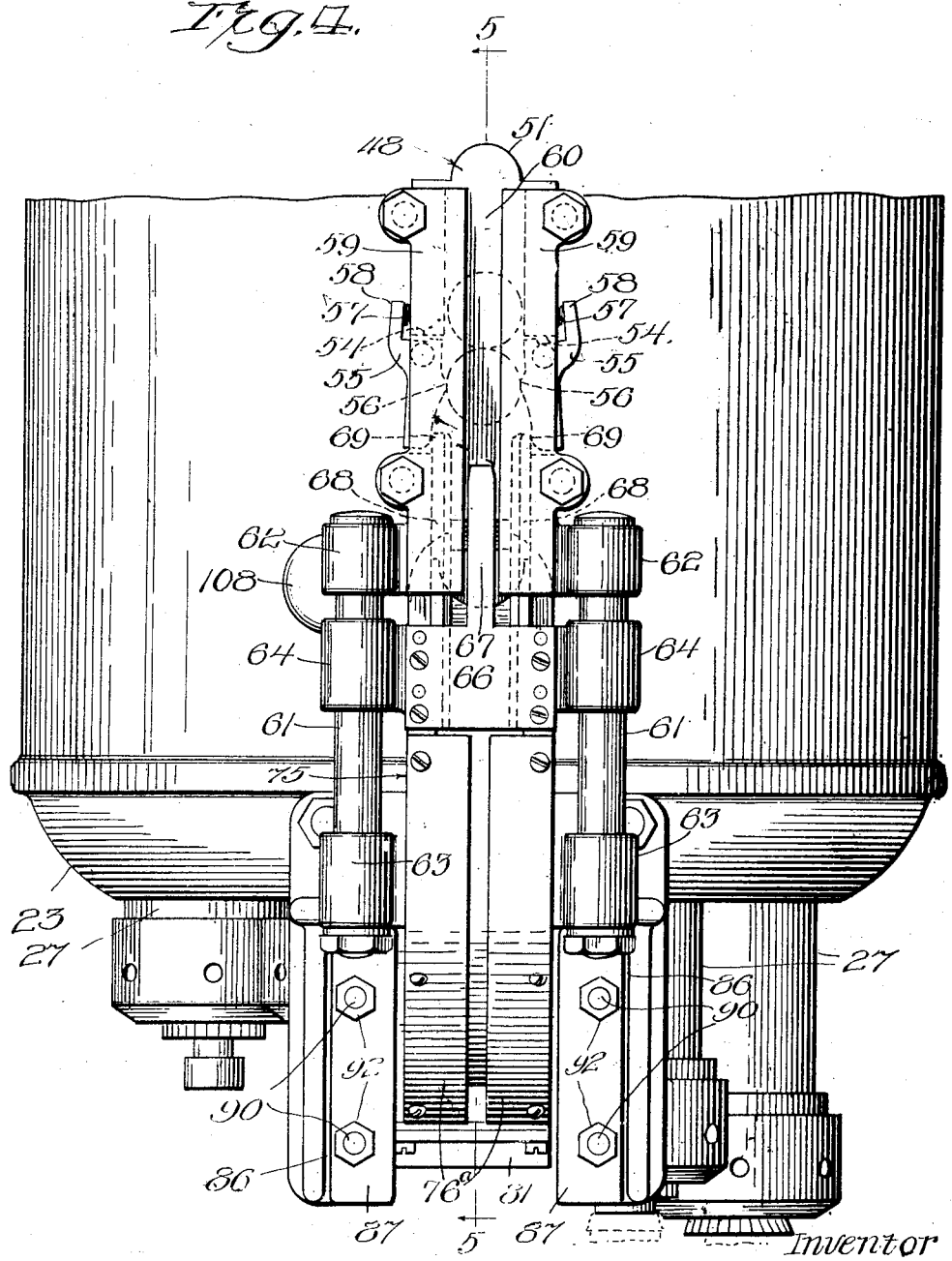

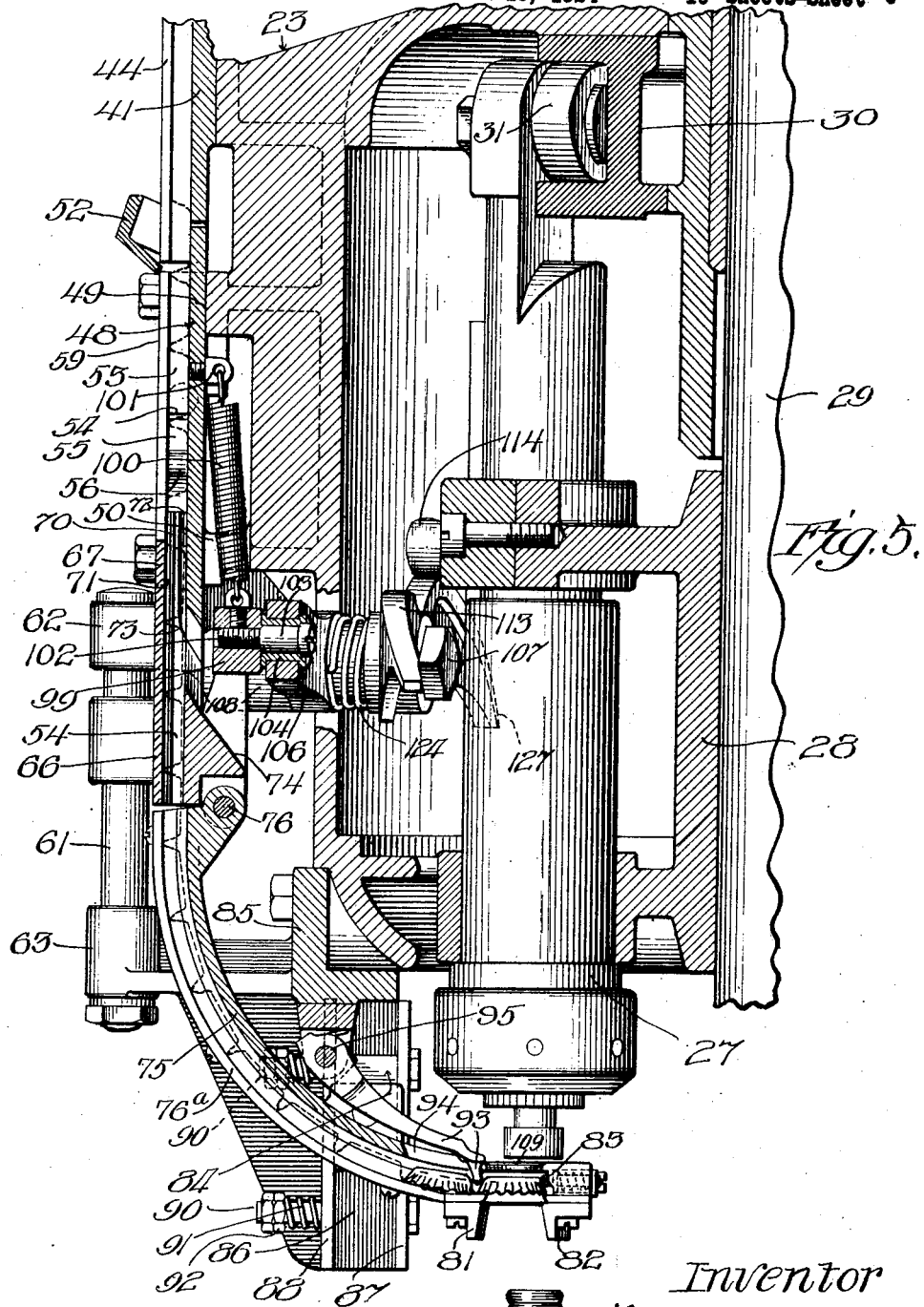

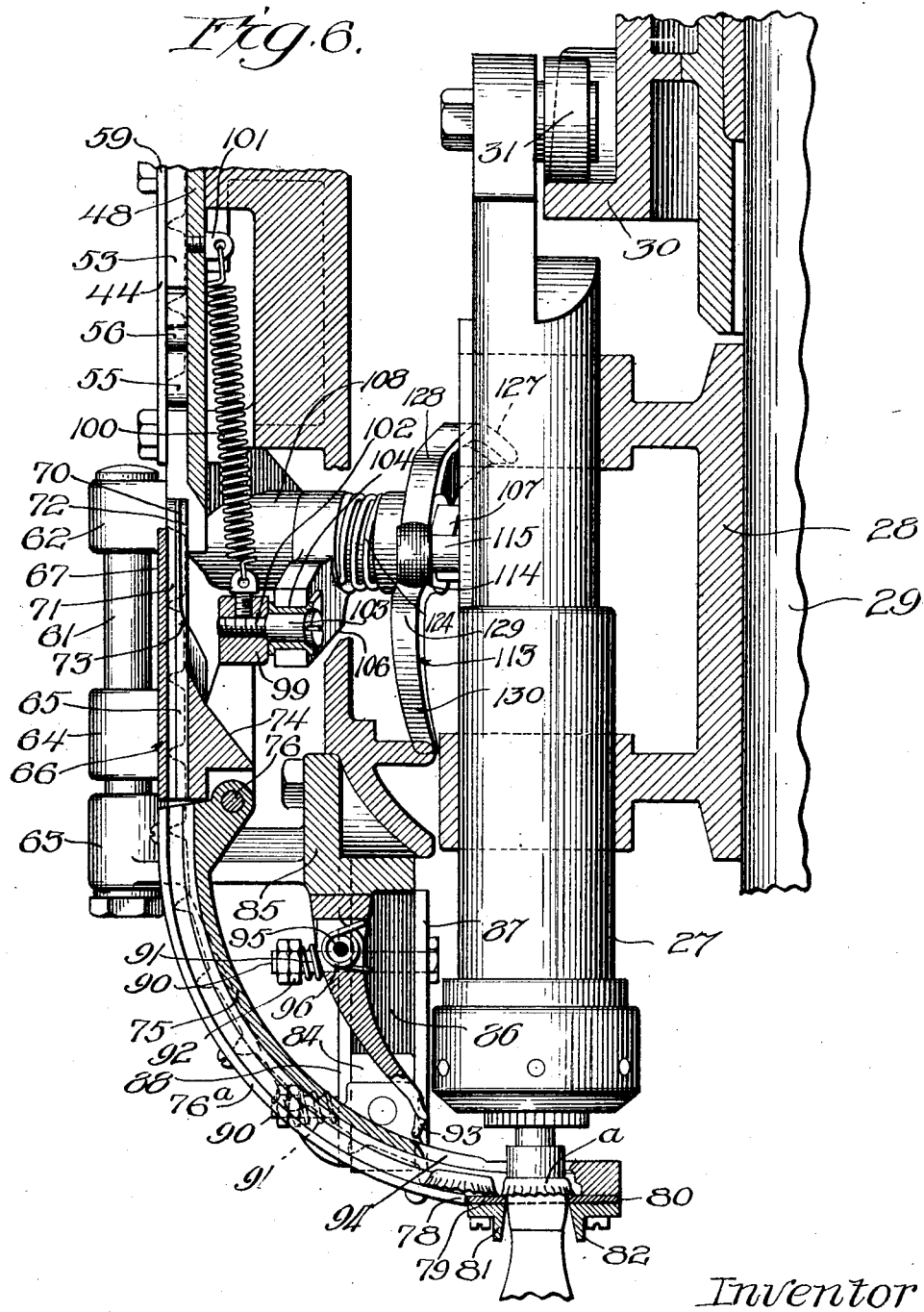

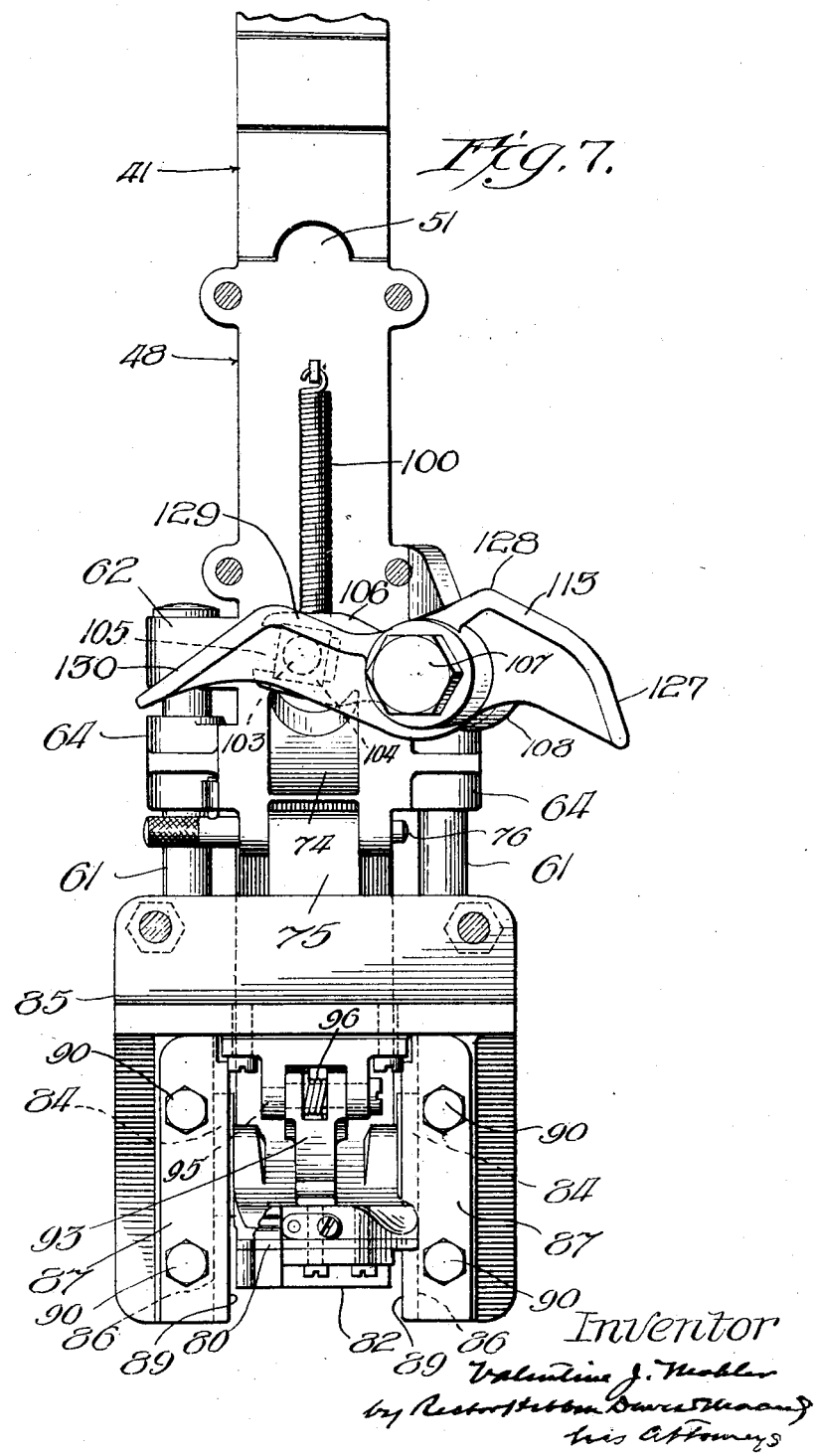

Oct. 9, 1928.

V. J. MOHLER 1,687,303

BOTTLE CROWNING MACHINE

Filed Feb. 15, 1924 10 Sheets-Sheet 8

Inventor:
Valentine J. Mohler
by Rector Hibben Davis and Macauley
his Attorneys

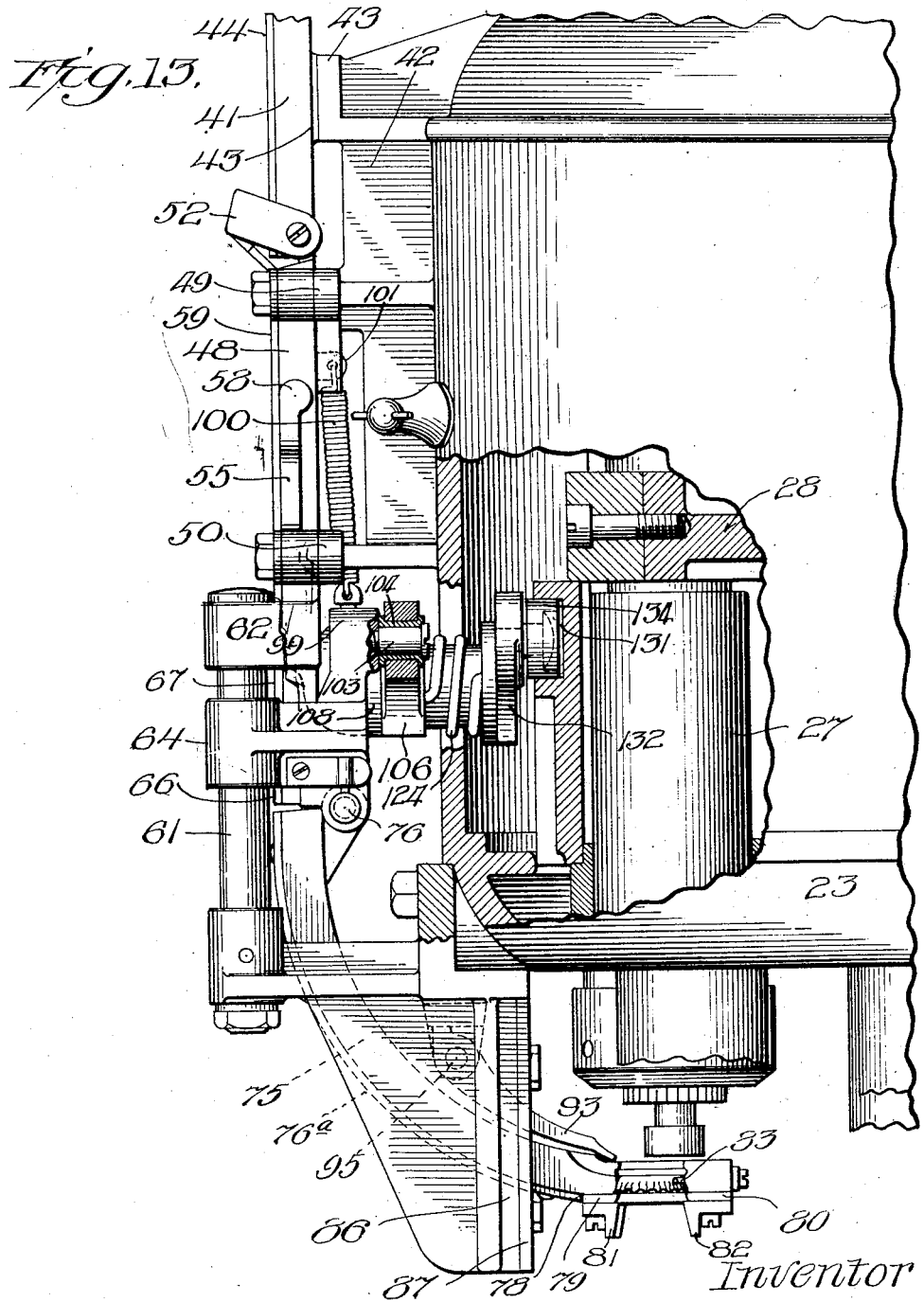

Inventor
Valentine J. Mohler

Patented Oct. 9, 1928.

1,687,303

UNITED STATES PATENT OFFICE.

VALENTINE J. MOHLER, OF WHEATON, ILLINOIS, ASSIGNOR, BY MESNE ASSIGNMENTS, TO THE LIQUID CARBONIC CORPORATION, OF CHICAGO, ILLINOIS, A CORPORATION OF DELAWARE.

BOTTLE-CROWNING MACHINE.

Application filed February 15, 1924. Serial No. 692,960.

The bottles and crowns therefor in connection with which my machines are used are well-known in the art. The mouth of the bottle is formed with a small rib or bead about the same and the crown or cap which my improved machine is designed to apply to the bottle is of relatively stiff sheet-metal and has a crimped slightly flaring skirt or flange, the top being lined with some sealing material such as cork. My invention relates to a machine for applying the crowns and securing them on the bottles by forcing the flanges of the crowns to engage beneath the beads about the mouths of the bottles to which they are applied.

The present invention is in the nature of an improvement on a bottle-crowning machine for which I have filed application Serial No. 611,326, on January 8, 1923. The machine of said application as well as that of the present application belongs to that class of bottle-crowning machines in which a rotary carrier is provided with a concentric series of reciprocating crowning heads located respectively over a series of bottle seats also mounted on the carrier, to which latter the bottles to be crowned are successively fed as the carrier rotates. As in prior machines of this character the bottle as it is carried around by the rotation of the carrier receives a crown and then the crowning head located above the same descends and locks the crown to the bottle, after which it recedes, permitting the bottle to be carried out of the machine by means provided for the purpose. The crowning heads which form a part of the machine are of a type disclosed and claimed in my Patent No. 1,511,745, granted October 14, 1924, and are characterized by an expansible sectional die, which, during the descent of the head in the sealing or clamping operation, is held contracted and of a diameter to force the crimped flange of a crown on a bottle into locking position and is thereafter permitted to expand to release the bottle. The present invention relates more particularly to the means for applying the crowns to the bottle in position to be locked or secured thereon.

In the machine of my application Serial No. 611,326, to which I have referred above the bottle crowns are fed to a holder or presenting device in which they are held in an inclined position in the path of the lips of the bottles so that each bottle, as it passes under the holder misses the one edge of the crown contained in the latter but engages the far edge and pulls the crown out of the holder or presenting means after which the crowning head descends to secure it in place on the bottle as previously described. In the machine of the present application, however, the crowns are held horizontally in the crown-applying device and the latter descends vertically as each bottle arrives in the proper position to place a crown thereon. Other features of the invention will appear from the following description and claims. It is to be understood, however, that the specific disclosure is for the purpose of exemplification only and that the scope of the invention is defined in the claims, it being my purpose to cover thereby all the features of novelty disclosed herein in the broadest manner that the prior art will permit.

Figure 2:
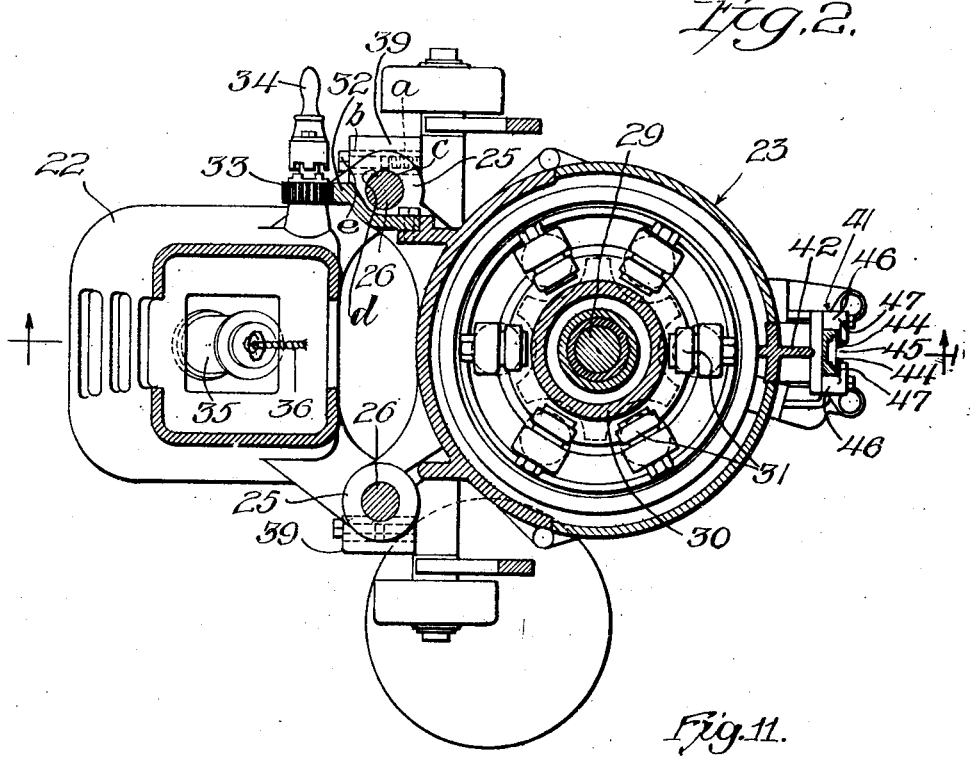
Figure 10:
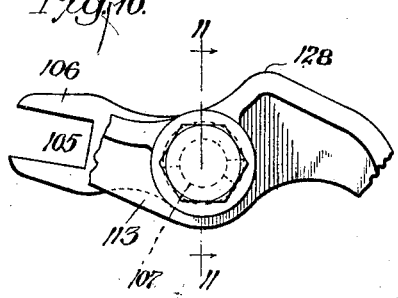
Figure 11:
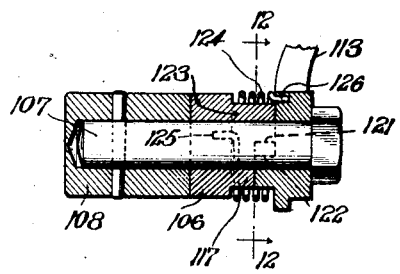
Figure 12:
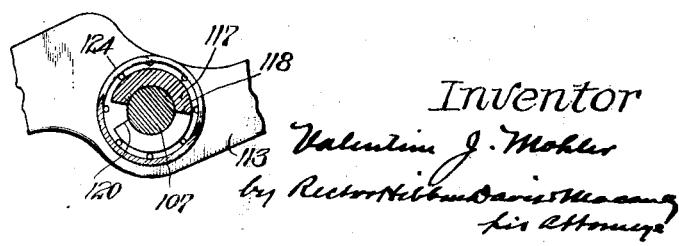
Figure 8:
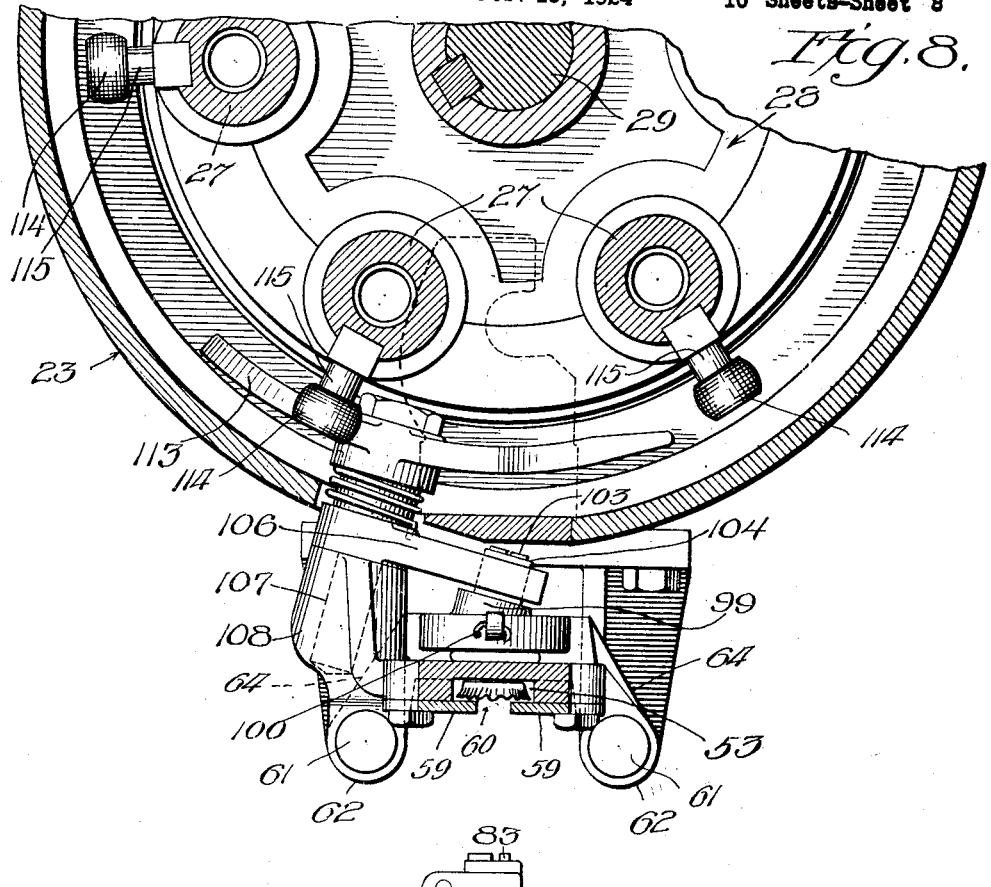
Figure 9:
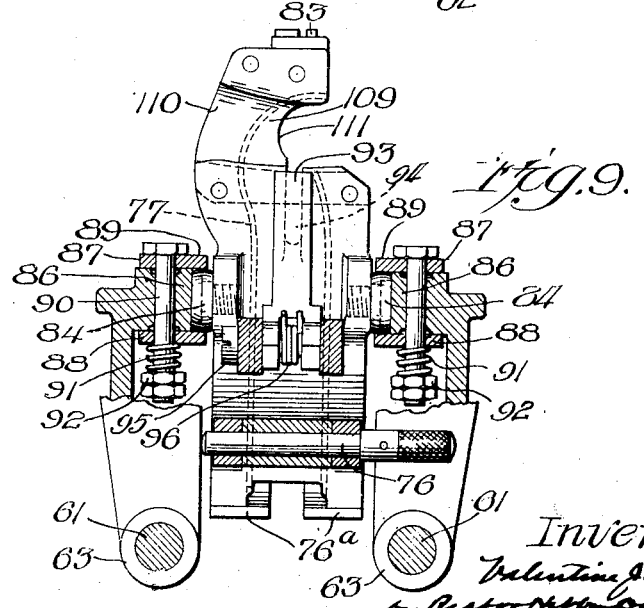
Figure 14:
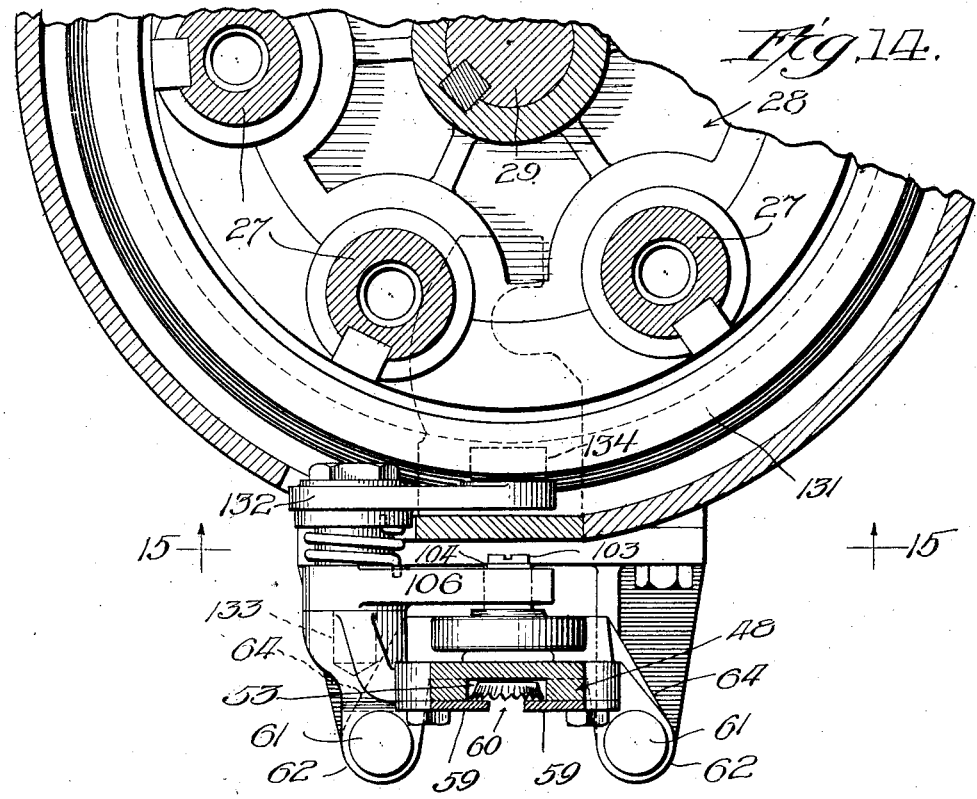

Referring to the drawings accompanying and forming a part of this specification, Fig. 1 is a vertical axial section of a preferred form of the invention on the line 1—1 of Fig. 2, parts being shown in elevation; Fig. 2 a horizontal section thereof on the line 2—2 of Fig. 1; Fig. 3 a side elevation on an enlarged scale of the portion of the machine to which the present invention more particularly relates, parts being shown as broken away to better disclose the construction; Fig. 4 a front view of the same; Fig. 5 a vertical axial section on the line 5—5 of Fig. 4, parts being shown in elevation; Fig. 6 a similar view with the parts in a different position; Fig. 7 a rear view of the crown feeding means detached from the machine; Fig. 8 a transverse section on the line 8—8 of Fig. 3; Fig. 9 a transverse horizontal section on the broken line 9—9 of Fig. 3; Fig. 10 a rear elevation of an element of the machine on an enlarged scale; Fig. 11 a vertical section of the same on the line 11—11 of Fig. 10, parts being shown in elevation; Fig. 12 a vertical transverse section on the line 12—12 of Fig. 11; Fig. 13 a side elevation of a somewhat different form of the invention, parts being broken away to show a vertical axial section of the interior and parts being shown in elevation; Fig. 14 is a horizontal section of the same and Fig. 15 a vertical section on the plane of the line 15—15 of Fig. 14.

Before describing the portion of the machine in which my present invention is more particularly embodied I will briefly describe the general construction which is more specifically shown and described in the applications to which I have referred above. Referring more particularly to Figs. 1 and 2 the upper portion of the base of the machine is indicated at 20 and the rotary bottle carrier which receives and holds the bottles while they are being capped at 21. The crown-applying means are supported above the bottle carrier by a standard 22 bolted to the base. A housing 23 which incloses and supports the crowning heads is adjustably mounted on the standard 22 by lugs 24, 25 on said housing embracing vertical columns 26 mounted on the support. The vertically reciprocable crowning heads 27 are guided in a rotary carrier 28 which is keyed to the main shaft 29 and vertically adjustable and rotatable therewith. The housing 23 is provided with a cam track 30 in which the rollers 31 of the crowning heads travel as the carrier 28 revolves thus reciprocating the crowning heads. A rack 32 is secured to the housing and is in mesh with a pin on 33 journaled on a stud projecting from the standard and adapted to be clutched to a handle 34 when it is desired to raise or lower the head with its associated parts to adapted the machine to bottles of a different size. A spring 35 connected to the housing by a cord 36 extending over a sheave 37 partially sustains the weight of the housing and thus renders the adjustment thereof less laborious. The housing may be locked in adjusted position on the column 26 by means of a pair of short sleeves or collars $a$, $b$ longitudinally movable in a bore in boss 39 formed on one of the lugs 25, said sleeves being cut away at $c$, $d$, respectively, and connected by an adjusting bolt $e$ which extends freely through the sleeve $b$ but is threaded into the sleeve $a$, as shown in dotted lines in Fig. 2. Obviously any other known form of locking means could be substituted for that described. The purpose of the adjustment just described is to adapt the machine for the crowning of bottles of different heights.

The upper end of the main shaft carries a bevel gear 40 which meshes with a bevel gear on the shaft of the crown-feeding hopper supported on the upper end of the machine. It is not thought necessary to show or describe the latter as it is a common device in machines of this character and for the present purpose it is immaterial which of the forms of hopper now in commercial use is employed, so long as it is adapted to keep the crown guide 41 attached thereto supplied with crowns.

The machine as thus far described is or may be substantially similar to the machine of my above mentioned application No. 611,- 326 and as the present invention relates only to the crown-presenting means further description of the general construction of the machine is thought to be unnecessary.

Referring to Figs. 2, 3 and 5 it will be noted that the front of the housing which incloses the crowning heads and their carrier is provided with an outwardly projecting rib 42, portions of which are machined to form seats for the several members of the crown chute or guide. An upper seat 43 is provided thereon against which the lower end of chute section 41 rests when in operative position. This chute section comprises a main channel member and face strips 44 which overlap the channel from opposite sides, leaving a space 45 between their inner edges. The upper chute section may be secured in position against seat 43 by turn buttons 46 having fingers 47 which may be turned over said face strips, see Fig. 2.

Immediately beneath the section 41 is a fixed chute section or guide 48 which is bolted to the upper and lower seats 49, 50, see Figs. 3, 4, 5 and 6. The upper end 51 of the fixed section is formed with a tongue which interlocks with a similarly shaped recess in the lower end of the section 41 to secure accurate registry. In order to prevent the crowns in the section 41 from dropping out when said section is moved away with the hopper from the fixed section a gate 52 is pivoted to the lower end of said section 41. When the latter is in the position shown in the drawings the gate 41 is held out of the way by contact with the fixed chute section but when section 41 is carried by the hopper out of alignment with the fixed chute section the gate drops into position to intercept the crowns.

The fixed guide or chute section comprises a main casting which is formed with a crown channel 53 (see Fig. 8) to receive the crowns from the chute section 41. The side walls of the channel are cut away at 54. Intermediate their ends, and within the cut-away portions are pivoted stop members 55, see Figs. 4 and 6. The inner or adjacent edges of the stop members form in effect continuations of the side walls of the channels but are provided with humps or projections 56 which, when the stop members are in their inner position, intercept the descent of the crowns. Springs 57 interposed between lugs 58 on the upper ends of said stop members and the side walls of the guide press the stop members inwardly. At proper intervals the stop members are swung outwardly to permit the passage of crowns by mechanism which will be explained shortly.

Face strips 59 are bolted to the walls of the main casting and project over the channel front leaving between their inner edges a longitudinal space 60 for a purpose which will appear.

From the fixed guide the crowns on the way to the holder enter a vertically sliding guide which is also formed with a crown channel, see Figs. 4, 5 and 6. Guide rods 61 for the sliding crown guide are secured at their upper ends in perforated lugs 62 formed upon opposite sides of the lower end of the fixed guide or chute section and at their lower ends in perforated lugs 63 formed upon opposite ends of a casting mounted upon the housing which will be later described. The main casting of the sliding guide is formed with lugs 64 which are guided upon the rods 61. It is also channeled at 65 to permit the crowns to slide edgewise therethrough, the channel being partially covered by a face plate 66. The face plate is formed with a tongue 67 extending upwardly in the plane thereof and into the space between the inner edges of the face strips of the stationary chute section or guide, see Figs. 4, 5 and 6. The side walls of the channel of the sliding guide are prolonged upwardly as at 68 and slide within the lower end of the channel of the fixed guide section which is of somewhat greater breadth than the upper part of the channel. It will be noted in Fig. 4 that the upper ends 69 of the side wall extensions of the sliding guide are adapted to slide within the lower ends of the stop members 55 and spread the latter when the sliding guide is in its upper position to permit the passage of a crown between the humps 56, the lower ends of the stop members being suitably rounded for this purpose.

As above stated it is necessary in order to avoid mishap that each crown when it reaches the holder by which it is applied to the bottle have its open side downward and the hopper feeding the crowns into the chute is provided with means to permit only properly faced crowns to enter the chute. Notwithstanding this provision it may occasionally occur that a crown enters the chute with its convex or top side forward. In connection with the sliding guide I have provided a simple construction by which only properly faced crowns are carried through the said guide, and reversely faced crowns are eliminated from the machine. For this purpose I take advantage of the fact that by reason of the flare of their flanges or skirts the crowns are of considerably larger diameter at their edges than at their top faces. The upper portion of each side wall of the channel in the sliding guide is formed with an intermediate rib 70. The channel in front of and behind the rib is of a breadth slightly greater than the diameter of the open end of the crown. The ribs, however, project sufficiently towards each other to narrow the passage to a breadth less than the diameter of the edge of the crown but slightly greater than the diameter of the upper portion of the crown. The front part 71 of the channel continues in full width throughout the length thereof. The widened back portion 72 of the channel, however, terminates in a curved shoulder 73, see Fig. 6. The sliding guide is open at the back in its upper portion and its rearward face is sloped or cut away at 74. Because of the construction just described properly faced crowns entering the sliding guide continue their downward movement therethrough. Crowns which reach this guide with their hollow sides rearwardly faced, however, are guided out of the machine by the ribs 70 which engaging the flange of the crown, carry it rearwardly and it is released from the guide and falls upon the rearwardly inclined face 74 thereof and drops out of the machine.

A curved guide 75 is pivoted at 76 to the lower end of the sliding guide and rises and falls therewith. This guide comprises, like the other guide section a channeled main casting, upon the side walls of which are mounted facing strips 76ª which project inward towards each other but leave an opening or slot between. See Figs 4 and 6. The crown holder or applying device is carried by said pivoted curved guide, the main portion thereof being integral with the channeled casting of the guide. The construction of the crown-holding or applying device is best seen in Figs. 5, 6 and 9. As will be best seen in the dotted lines in Fig. 9 the channel of the curved guide is carried or continued into the lower face of the crown holder, the end of the channel curving around from a direction at 77 substantially transverse to that of the movement of the bottles beneath said guide and opens in a direction tangent to the path of movement of the bottles so that a crown after being applied to a bottle may move with the latter out of the holder. The facing strips 76ª terminate short of the holder as at 78 but other strips 79, 80 substantially continue the function of the facing strips so as to prevent the crowns from dropping out of the guide and holder on their way to the position shown at $a$ in Fig. 6. A pair of bottle guides 81, 82 screwed to the under face of the holder over the strips 79, 80 serve to properly guide the bottle through the holder. It will be observed that the opening between the strips 79, 80 and the bottle guides 81, 82 is sufficient to permit the head of a bottle to extend therethrough to receive the cap.

A yielding spring-pressed bolt 83 gently engages the cap in position in the holder so as to prevent its accidental discharge and at the same time permit it to be readily carried out of the holder with the bottle.

As heretofore stated the curved guide and holder are carried up and down with the sliding guide. The free or unpivoted end of the curved guide is guided in its vertical movement so as to accurately descend into the path of the bottles under the impulses of the reciprocating mechanism. The sides of the curved guide near the lower end thereof are provided with rolls 84 which engage guides formed on the same casting 85 of which the above mentioned lugs 63 are integral parts. The adjacent faces of the guides 86, which engage the ends or faces of the rolls are parallel to prevent sidewise movement of the curved guide. Forward or backward movement of the rolls 84 is restrained by yielding guides 87, 88 held against the forward and rearward faces of said guides 86, and projecting inwardly as at 89 beyond the respective adjacent faces of said guides 86 to engage the peripheries of the respective rolls. The guide strips 87, 88 on each guide are mounted on bolts 90, of which there are two for each pair of strips, and a spring 91 is mounted on each bolt between the nut 92 thereon and the adjacent strip. By this construction either of the strips is permitted to yield slightly when required to prevent binding on the respective blocks. Thus the pivoted guide is properly guided in its upward and downward movement with the sliding guide.

In order to positively move the lowermost crown in the curved guide to this position in which it is applied to the bottle I provide a finger 93 which moves backward and forward in the channel of said guide for this purpose. The upper wall of the channel is slotted at 94 and the end of finger 93 extends through the slot, said finger is pivoted at its upper end at 95 on said casting 85 and a spring 96 upon the pivot 95 of the finger engages the latter, and the bracket in which the finger is mounted in such a way as to exert a yielding downward pressure on the finger. Obviously with this construction as the curved guide rises the tip of the finger moves outwardly toward the crown-holding or presenting device and as the curved guide descends the tip of the finger moves forwardly therein.

The top of the crown-applying device is formed with a channel 109 see Figs. 1 and 9 to receive and guide the heads of the plungers as they descend to engage the crowns on the bottles. Preferably the entering end of the channel is flared as at 110 and the floor or bottom thereof inclines downwardly toward the top of the crown channel, so that the curved edge 111 between the two channels is comparatively narrow or sharp, so that the plungers drop but a short distance onto the crowns beneath.

I will now describe the means provided for reciprocating the sliding guide. The main casting thereof is formed with a boss 99 to which the lower end of a spring 100 is attached, the upper end of said spring being attached to a screw eye 101 on a stationery guide section. The boss 99 is drilled and threaded at 102 to receive the arbor pintle 103 of a sliding block 104, which sliding block reciprocates in the slot or fork 105, of the oscillating arm 106, see Figs. 5 to 13 inclusive. Arm 106 is pivoted on a stud or arbor 107 which is mounted in a boss 108 formed integral with the main casting of the stationary guide 48. The arm 106 is oscillated by means to be presently described to raise and lower the sliding guide and attached parts so that the crown-applying device is raised as each bottle approaches it and then is depressed after the bottle is under the guide and in position to have a crown applied thereto. In the form of the invention shown in Figs. 1 to 12 inclusive the arm is operated by the descent of the crowning heads as they successively approach and pass the crown-applying position. In the specific form of the invention shown in Figs. 13 to 15 inclusive the movable crown chute and applying device are raised and lowered by means of a cam associated with the carrier for the crowning heads. Other means for accomplishing this purpose may be adopted. Referring now to the form of oscillating mechanism shown in the first twelve figures of the drawing a lever 113 is journaled upon the same pin 107 upon which arm 106 is mounted, said lever being curved in an arc concentric with the main shaft and arranged to be acted upon by rollers 114 journaled upon pins 115 mounted upon the respective crowning heads, see Figs. 6 and 8. The hub or sleeve of lever 113 projects slightly towards the hub or sleeve 117 of the arm 106 and is mutilated or cut away at 118. The hub or sleeve 117 of the arm 106 is similarly cut away on the side adjacent the hub of the lever at 120, the remaining sleeve sections overlapping each other as best seen in Figs. 11 and 12 so that the shoulders 121, 122 thereof are adapted to engage each other. The sleeve arcs taken together lack somewhat of a complete circle so that a limited play or lost motion is permitted between the lever 113 and the arm 106. The sleeves on the respective hubs are somewhat reduced at 123 to receive a spring 124 which is coiled about said reduced portions of the sleeves and anchored at 125, 126 to the respective hubs. The spring tends to hold the lever and arm in the respective positions shown in Fig. 7.

The form of the cam surface of the lever is best seen in Figs. 6 and 7. As each roll is carried past the cam lever it first engages the cam surface at a point substantially as indicated at 127 and as it continues its movement depresses the arm of the lever with which it engages thereby raising the other arm. The shoulder on the hubs or sleeves of the lever and arm respectively being at this time in engagement, the arm is also raised, the upward movement being assisted by the spring 100. As the roll passes over the hump 128 on the lever the latter is permitted a return movement and as the roll passes the center of the lever and engages the other arm thereof as at 129 the lever is tilted, the motion being accelerated by the downward movement of the crowning head and roll at this point. The arm 106 descends with the lever until the crown-applying device and hence the curved and sliding guides and the arm are stopped by contact with the bottle beneath the same, the spring 124 then permitting a slight additional movement of the lever which is not shared by the arm. After the roller passes off the arm 130 of the lever the latter is permitted a return to normal position under the action of the spring 100.

Figure 15:
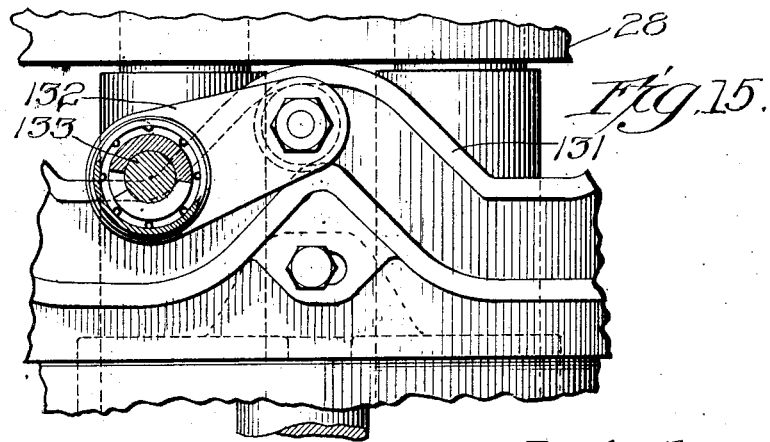

It is somewhat simpler to operate the arm 106 from a cam on the crowning head carrier and I have shown a suitable means for this purpose in Figs. 13, 14 and 15. In this construction an arm carrying a roller is substituted for the cam lever, the roller engaging a cam path on the crowning head carrier. The cam path or groove in the crowning head carrier is indicated at 131 in Figs. 13 and 15. In this form of the invention the arm 106 is mounted to extend parallel to the back of the crown guide, the arbor or pivot thereof not being radial to the machine as in the construction first described. Arm 132 is mounted on the same arbor 133 as arm 106 and is connected to the latter with the same capacity for lost or independent motion as in the form of the invention first described. The arm 132 carries a roller 134 at its end which roller engages the cam track on the crowning head carrier previously described. As clearly seen in Fig. 15 the cam track is of such form as to raise the roller and the two arms and consequently the crown-applying device as each crowning head approaches the crowning position and then drop or lower these elements when the bottle is directly beneath the crown-applying device.

The operation of the machine has been described in detail in connection with the descriptions of the various parts thereof. It may be briefly recapitulated as follows; the bottles are fed by any suitable mechanism or by hand to the seats of the rotating carrier 21 as they successively approach the crowning position. The crown guide or chute is constantly supplied with crowns fed thereto with their hollow sides forward so that when they reach the crown-applying device they are in the proper position for application to the bottles fed beneath the latter. As each crowning head with the bottle beneath it approaches the crown-applying device the latter is raised to the position shown in Fig. 5, the finger 93 during the raising operation insuring that the lowermost crown in the guide is carried into the crown-applying device and accurately positioned therein in contact with the yielding stop pin 83. The upward movement of the sliding guide section also forces the crown stops 55 in the stationery guide section outward so that the crown immediately above the same is permitted to pass between the humps 56 thereof and into the movable guide section. As heretofore pointed out an improperly faced crown is eliminated from the machine during its downward passage through the sliding guide. A crown being in proper position in the applying device the latter descends at the proper moment to place the crown on the mouth of the bottle beneath and the plunger of the crowning head immediately follows and yieldingly engages the channel 109 in the top of the crown applying device and with the further travel thereof drops onto the crown on the bottle, and holds the same with sufficient firmness to retain it on the bottle until the further descent of the crowing head forces the die over the crown thus completing the operation.

I claim:

1. In a machine of the class described, a bottle carrier, a die carrier movable therewith, a series of vertically movable dies on the carrier, means for reciprocating each die as it arrives at a definite position, a vertically movable crown applying device, means for causing said device to descend to apply a crown to a bottle in advance of the descent of the die above said bottle, a plunger associated with each of said dies and adapted to engage a crown in said crown applying device.

2. In a machine of the class described, a bottle carrier and a die carrier movable together horizontally, a series of vertically movable dies on the die carrier, a vertically movable crown applying device mounted independently of the die carrier and adapted and arranged to descend and apply a crown to each bottle on the carrier as it arrives beneath said crown applying device, means movable with the dies adapted to engage the crown on a bottle before it leaves said applying device, and means for causing each die to descend and operate upon a crown on the bottle beneath said die.

3. In a machine of the class described, a rotary carrier adapted to receive and carry bottles in a horizontal path, a die carrier movable therewith, a series of vertically movable dies on the carrier, a plunger carried by each die and reciprocable therethrough, a vertically movable crown applying device in the path of the bottles on the carrier, means for causing said device to descend to apply a crown to a bottle in advance of the descent of the die, means for causing each die to descend whereby its plunger engages the crown on a bottle before it leaves the crown applying device and then the latter descends to secure the crown on the bottle.

4. In a machine of the class described, a bottle carrier, a die carrier movable horizontally therewith, a series of vertically movable dies on the carrier, means for reciprocating each die as it arrives at a definite position, a vertically movable crown applying device, means for causing said device to descend to apply a crown to a bottle in advance of the descent of the die on said bottle, a stationary crown chute, and a vertically reciprocating crown chute movable with the crown applying device adapted to receive crowns from the stationary chute and feed them to the crown applying device.

5. In a machine of the class described, and in combination with a bottle carrier, die carrier, and vertically movable dies thereof, means for reciprocating each die as it arrives at a predetermined position, a vertically movable crown applying device, means for causing said device to descend to apply a crown to a bottle in advance of the descent of the die over said bottle, said means comprising a vertically movable crown chute communicating with said device, and means for raising and lowering said chute and crown applying device.

6. In a machine of the class described, and in combination with a horizontally movable bottle carrier and die carrier a series of vertically movable dies on the carrier, means for reciprocating each die as it arrives at a predetermined position, a vertically movable crown applying device located at said position, a vertically movable crown chute connected to said device and movable therewith, means for reciprocating said chute and crown applying device to apply crowns to bottles passing beneath said device, a plunger extending through each die and vertically movable relatively thereto.

7. In a machine of the class described, a bottle carrier moving in a horizontal path, a die carrier moving therewith, a series of dies vertically movable in said carrier, means to vertically reciprocate said dies at a predetermined point, plungers movable through said dies and adapted to engage crowns on the bottles beneath said dies, a crown-feeding chute, a crown-applying device connected to and supplied by said chute, means for raising and lowering the crown-applying device, and means adapted to engage the lowermost crown in the chute and feed it into the crown-applying device.

8. In a machine of the class described, a bottle carrier movable in a horizontal path, a die carrier moving therewith, a series of dies vertically movable in said carrier, means to vertically reciprocate said dies at a predetermined point, plungers movable through said dies and adapted to engage crowns on the bottles beneath said dies, a crown-feeding chute at said predetermined point comprising a stationary and vertically movable section, a crown-applying device connected to and supplied by said chute, means for raising and lowering said vertically movable section and the crown-applying device, a finger pivoted on the stationary part of the chute and extending into said chute, and adapted to engage a crown in the latter and move it to the proper position for application to a bottle.

9. In a machine of the class described, a rotary bottle carrier, a die carrier rotatable therewith, a series of vertically reciprocable dies on the die carrier, means to reciprocate the dies as they reach a predetermined position, plungers extending through the respective dies and adapted to engage a crown on the bottle beneath the same, a crown-applying device having an open side through which a crown therein may be removed, means for yieldingly holding a crown in said device, means for raising and lowering said device, said device being cut away to permit a plunger and a bottle to engage a crown therein and remove it therefrom.

10. In a machine of the class described, a bottle carrier and a die carrier rotatable together, a series of dies carried by the latter, a plunger extending through each die, a crown-applying device arranged to reciprocate into and out of the path of a head of a bottle on the carrier, said device being open at the top, bottom and one side to permit the head of a bottle to enter the same from below and engage a crown therein, a plunger to enter the same through the top and engage the crown and the bottle crown and plunger to leave the device together.

11. In a machine of the class described and in combination with a rotary bottle carrier, die carrier and vertically reciprocating dies, a crown-applying device, means for raising and lowering the crown-applying device, a vertical stationary crown guide, a vertically sliding crown guide in registry with the stationary guide and adapted to receive crowns therefrom, and a curved guide pivoted to the sliding guide to receive crowns therefrom and convey them to the crown-applying device.

12. In a machine of the class described, a stationary vertical crown guide, a vertically reciprocable crown chute in registery therewith, a crown-applying device connected to and vertically movable with the last said chute section, a pivoted arm for reciprocating the vertically movable chute section, a second pivoted arm, means for oscillating the second pivoted arm and lost motion connections between the two arms.

13. In a machine of the class described, a stationary crown chute, a vertically sliding crown chute in registery therewith, a pivoted arm having a pivoted connection to said sliding chute section, a second pivoted arm having a limited movement with reference to the first said arm, a spring forming a yielding connection between said arms, and cam means for oscillating the second said arm.

14. In a machine of the class described, a rotary bottle carrier, a die carrier rotatable therewith, an annular series of vertically reciprocable dies on the latter, means for reciprocating each die as it reaches a predetermined position, a vertically reciprocating crown-applying device mounted independently of the bottle and die carrier, a vertically swinging arm pivoted on a stationary part of the machine and engaging said crown-applying device to reciprocate the same, and means on the die carrier for swinging said arm as each die approaches the same.

VALENTINE J. MOHLER.